Sept. 16, 1969    R. E. PRICE    3,466,976
FEED MECHANISM FOR GRINDING MACHINE
Filed Sept. 16, 1966    3 Sheets-Sheet 1

INVENTOR
RALPH E. PRICE

BY Mason, Porter, Diller & Brown
ATTORNEYS

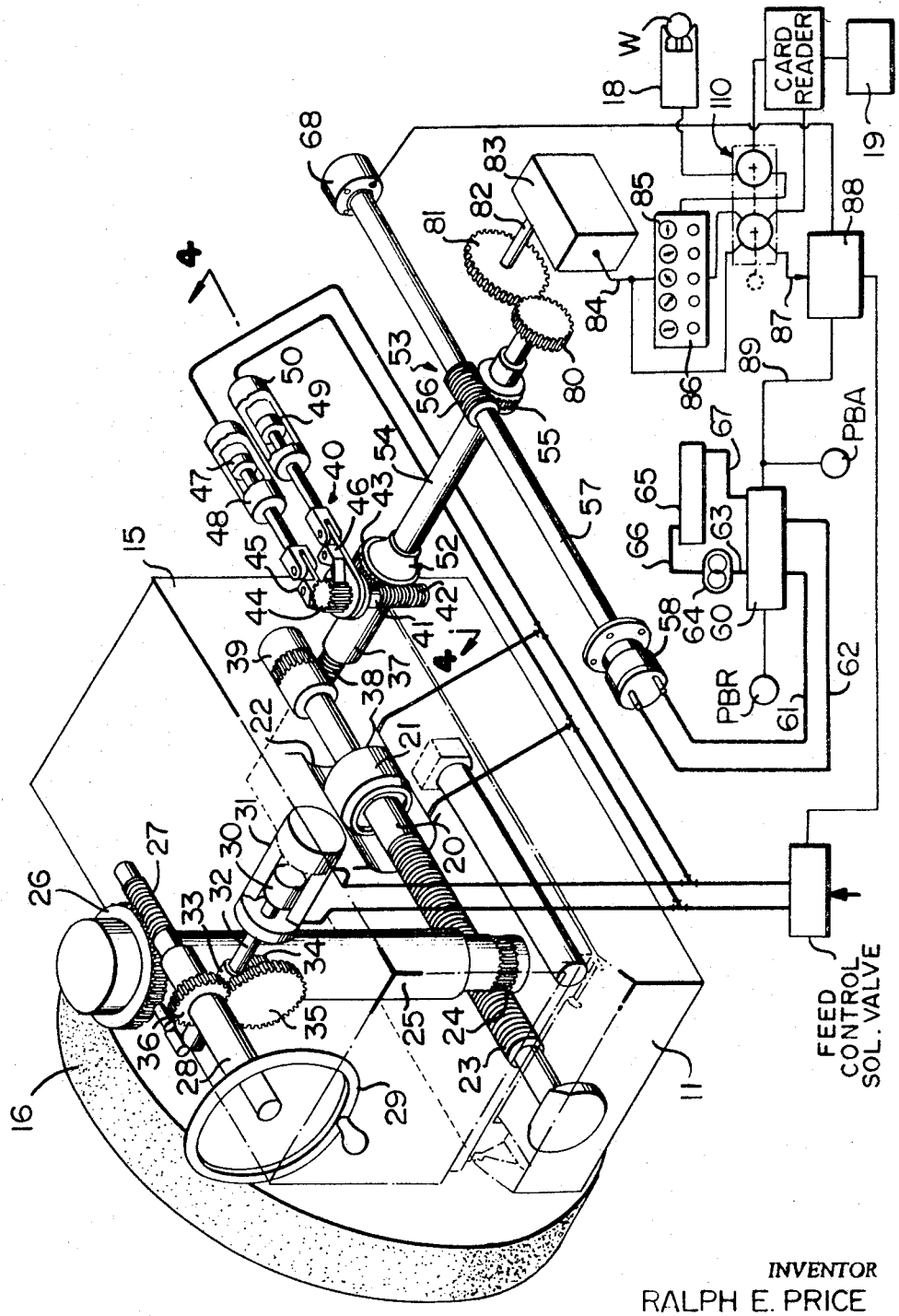

Sept. 16, 1969   R. E. PRICE   3,466,976
FEED MECHANISM FOR GRINDING MACHINE
Filed Sept. 16, 1966   3 Sheets-Sheet 3

INVENTOR
RALPH E. PRICE

BY
Mason, Porter, Diller & Brown
ATTORNEYS

United States Patent Office 3,466,976
Patented Sept. 16, 1969

3,466,976
FEED MECHANISM FOR GRINDING MACHINE
Ralph E. Price, Waynesboro, Pa., assignor, by mesne assignments, to Land Tool Company, Waynesboro, Pa., a corporation of Delaware
Filed Sept. 16, 1966, Ser. No. 580,000
Int. Cl. B24b 49/00, 51/00
U.S. Cl. 51—165       15 Claims

ABSTRACT OF THE DISCLOSURE

This disclosure relates to a mechanism for feeding a grinding wheel of a grinding machine toward and away from a workpiece. The mechanism includes a rotatably mounted feed screw through which motion is imparted for moving the grinding wheel relative to the workpiece. The mechanism further includes a positioning device for rotating the feed screw before a machining operation to position the grinding wheel for machining the workpiece to a predetermined dimension. A fine incremental feed actuating device is also provided for actuating the feed screw to modify the set-up effected by the positioning device as may be required to complete the grinding operation. Both the positioning device and the actuating device are independently interconnected with the feed screw through a differential transmission.

---

This invention relates in general to new and useful improvements in feed mechanisms for machine tools, particularly to means for feeding a grinding wheel of a grinding machine toward and away from a workpiece, and more particularly, for rapidly adjusting the feed mechanism to change the position of the grinding wheel and the wheel support from the position for grinding one diameter to a position for grinding another diameter.

It is, therefore, an object of the present invention to provide a feed mechanism which can be rapidly adjusted for different diameters by a positioning device which functions through the feed mechanism, but which is not affected by the operation of the feed mechanism during a grinding operation.

Another object is to change the set-up of the grinding wheel feed from that required to grind one diameter to the proper set-up required to grind another diameter.

Another object is to provide a means to pre-program one or a series of set-ups of the machine to grind any pre-established dimension or series of dimensions without requiring the skill, time or manual operation necessary to produce a similar result by trial and error.

A further object is to provide a feed mechanism which once set to a known dimension can be rapidly adjusted for different diameters and a means such as dials, tape, card, etc. to provide input information in digital form to control the rapid adjustment.

The positioning device, which consists of a suitable motor, is connected through a differential transmission to the feed screw. The positioning device is also connected direct to a transducer which feeds absolute relative information to an electronic read-out device and position control device. In addition to the feed positioning device, a fine incremental feed actuating device is connected to the feed mechanism through the same differential transmission and actuates the feed screw to modify the set-up effected by said positioning device as may be required to complete the grinding operation as determined by an in-process gauge. When the positioning device or mechanism is in operation, it actuates the feed mechanism and also the read-out device without affecting the fine feed actuating mechanism. When the fine feed actuating machanism is in operation, it operates the feed mechanism to advance and reset the wheel support to perform a grinding operation without affecting the positioning mechanism, the read-out device, or the relation between the transducer and the dial input.

In accordance with this invention, the work dimension setting of the feed mechanism may be changed by means of decade dial switches which represent each digit of the desired dimension. The positioning device is set in motion to move the wheel support to a position corresponding to a selected workpiece dimension. While this change is taking place, it is shown on the read-out device. When the wheel support and read-out device reach the position for which the read-out device has been preset, the circuit through said dial switches provides a signal to stop the positioning mechanism. The change in the positioning device may also be effected automatically by means of a punch card device through which connections are made to perform the positioning function. The punched card device also functions in accordance with a transducer operable in response to a traversing movement of a workpiece to place different diameters of a workpiece in operative relation with the grinding wheel. The positioning device automatically changes the position of the wheel support for the new diameter. With this arrangement, the read-out device functions only when the wheel support is being shifted from one diameter setting to another. Both the increment feed adjustment and the positioning operation are performed by rotation of the feed screw. However, because of the differential gearing in the connection between the positioning device and the feed adjusting device and the feed screw, the feed screw may be rotated by a ratchet mechanism without changing the circuit through said dial switches or the read-out device which shows the diameter in question.

From the foregoing, it will be seen that the invention is directed to a device for rapidly changing the setting of the grinding wheel feed mechanism from one dimension to another with means for automatically stopping the device in the new position. The invention also relates to means for visually indicating the position of the grinding wheel at any instant in terms of workpiece dimension.

The device of this invention also includes means for rotating a feed screw either incrementally or continuously for performing a feed adjusting operation or for rapidly shifting the wheel support from a position for grinding one diameter to a position for grinding another diameter.

It is to be understood that in accordance with this invention, the feed actuating means for advancing the grinding wheel during a grinding operation and the positioning means function independently of one another. The positioning means never functions during the grinding operation. However, at the end of the positioning movement, the grinding wheel is not in a position corresponding to the dimension shown on the read-out device. This dimension is reached only at the end of a grinding operation as determined by a sizing device or a timing device. To reach this point, the positioning movement must be followed by a further advance of the grinding wheel through a fixed distance consisting of a rapid feed and a grinding feed. This combination of positioning movement, rapid feed and grinding feed is designed to advance the grinding wheel to a point at which the workpiece is still slightly oversize by an amount which may vary from piece to piece because of random variation in the spacing of the wheel support and work support. If allowance is not made for such variation, some workpieces would reach final size before the end of the grinding feed which is undesirable, while others would still be oversized at the end of the grinding feed. For this reason, the relative position of the feed screw and wheel support which is effected by rotation of the feed screw, is supplemented by further rotation of the feed screw in order to reach the workpiece dimension for which the positioning device has been set and which is signalled by the sizing device.

With the above and other objects in view that will hereinafter appear, the nature of the invention will be more clearly understood by reference to the following detailed description, the appended claims and the several views illustrated in the accompanying drawings.

FIG. 3 is a diagrammatic view showing the positioning device incorporated in the feed mechanism of the grinding machine.

Figure 2:
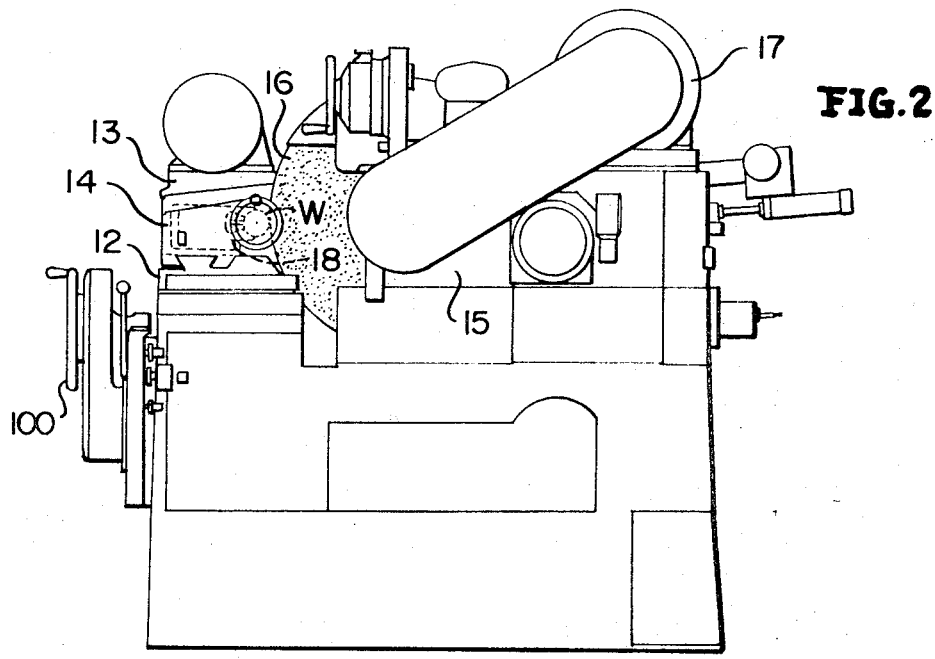
FIG. 2 is an end elevational view of the grinding machine taken from the right of FIG. 1.
Figure 1:
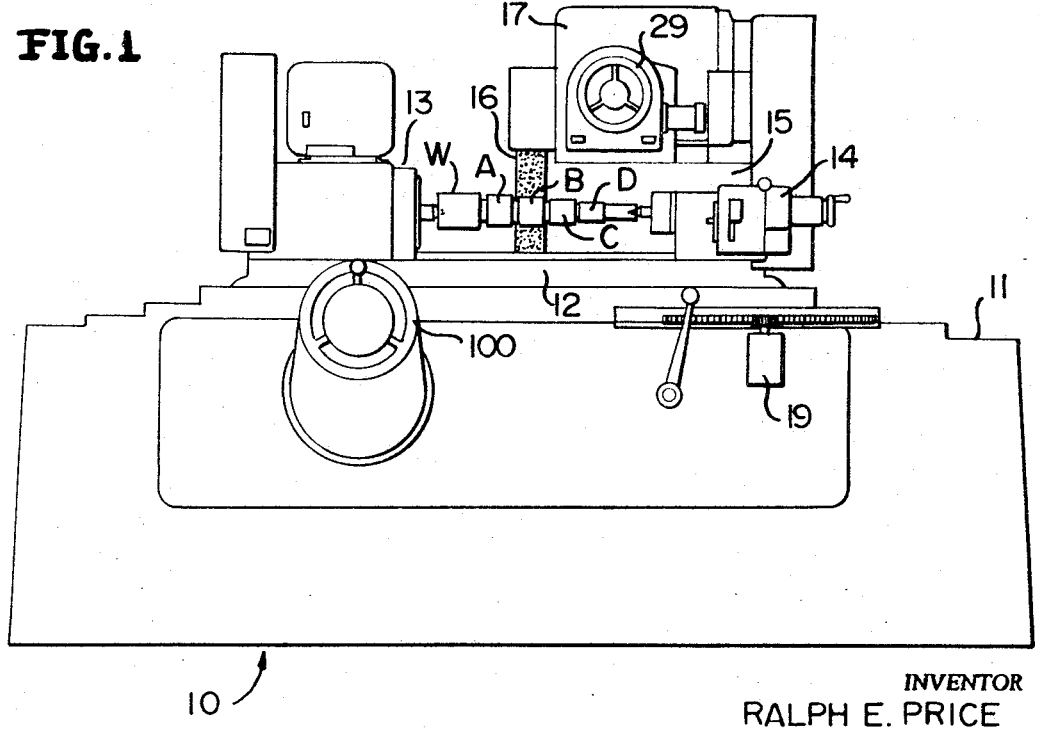
FIG. 1 is a front elevational view of a grinding machine incorporating the feed mechanism of this invention.

Referring now to the drawings in detail, it will be seen that there is illustrated in FIGS. 1 and 2 a grinding machine which is generally referred to by the numeral 10. The grinding machine 10, except for the specific feed mechanism which is the subject of this invention, is of a conventional construction and includes a bed 11. The bed 11 has mounted thereon in a conventional manner for longitudinal sliding movement, a work carriage or support 12. At one end of the work support 12, there is mounted a headstock 13 which is suitably driven in a conventional manner. At the opposite end of the work support 12, there is mounted a conventional type of tailstock 14. A workpiece W is mounted between the headstock 13 and the tailstock 14 for rotation by the headstock 13 about a predetermined axis and for longitudinal shifting with the work support 12. For the purpose of illustration, longitudinal shifting of work support 12 may be effected by the hand wheel 100. It is to be noted that the workpiece W has a plurality of portions A, B, C and D which are to be of different dimensions. Transducer 19, driven by carriage 12, provides a signal when each of said portions is in position for grinding.

A grinding wheel support 15 is slidably mounted on bed 11 for controlled movement transversely of the work support 12 in a conventional manner. A grinding wheel 16 is carried by the wheel support 15 for rotation. The grinding wheel 16 is driven by means of an electric motor 17.

It is to be understood that the grinding wheel 16 is fixed longitudinally of the bed 11 but is shiftable transversely of the bed 11 both for the purpose of grinding different dimensions on the workpiece W and to compensate for variations in the diameter of the grinding wheel. With the grinding wheel 16 in a retracted position, workpiece W will be positioned longitudinally of bed 11 to position one of the portions thereof in alignment with the grinding wheel 16.

After the workpiece W has been properly positioned in alignment with the grinding wheel 16, the grinding wheel 16 is advanced towards the workpiece when the grinding operation is performed. In the past, automatic feed mechanisms for the grinding wheel support 15 to automatically effect the repeated grinding of workpiece portions to the same diameter, have been provided. The purpose of this invention is to provide a further feed mechanism in the form of a positioning device which will change the setting of the feed mechanism to provide for the grinding of various diameters without overriding the adjustment of the feed mechanism so that each diameter of the workpiece W will be accurately ground after an initial setting of the machine.

The feed mechanism for advancing and retracting the wheel support 15 for a grinding operation includes a feed screw 20 which is slidably mounted in bed 11. The feed screw 20 carries a piston 21 which is mounted within a cylinder 22 to effect the rapid advancing and retracting movements of the feed screw 20.

The feed screw is in threaded engagement with a worm wheel 24 formed on the lower end of a vertical shaft 25. The vertical shaft 25 is carried by the wheel support 15 and extends vertically therethrough. At the upper end of the vertical shaft 25, there is positioned another worm wheel 26. The worm wheel 26 is in operative engagement with a worm 27 carried by a hand wheel shaft 28 which supports a forwardly facing hand wheel 29. Shaft 28 may be selectively rotated by either the hand wheel 29 or by means of a piston 30 which is mounted within a cylinder 31. Piston 30 has coupled thereto by means of a shaft 32 a rack member 33 which is meshed with a pinion 34. Pinion 34 is directly coupled to a gear 35 which is meshed with a gear 36 carried by shaft 28.

The feed screw 20 may also be utilized for advancing and retracting the wheel support 15 by being rotated. This is accomplished by means of a shaft 37 having a worm 38 meshed with a worm wheel 39 carried by the feed screw 20. A further mechanism is provided for effecting the rotation of the shaft 37. This feed mechanism is generally referred to by numeral 40.

The mechanism 40 is an incremental mechanism and includes a shaft 41 having formed on one end thereof a worm 42 which is meshed with a worm wheel 43 coupled to the shaft 37. At the opposite end of the shaft 41, there is a ratchet 44 which has associated therewith a pair of pawls 45 and 46 which may be actuated to selectively rotate the shaft 41 in a predetermined direction. The pawl 45 is actuated by a piston 47 mounted in a fluid cylinder 48. The pawl 46 is actuated by a piston 49 mounted in a fluid cylinder 50.

At this point, attention is directed to the fact that the construction of the feed mechanism as specifically described above, is substantially the same as that shown in U.S. Patent Nos. 3,046,706, granted July 31, 1962 and 3,047,988, granted Aug. 7, 1962.

In accordance with this invention, shaft 41 is not directly coupled to shaft 37 by the worm wheel 43. Instead the worm wheel 43 is part of a differential transmission, which is referred to in general by numeral 52. The worm wheel 43 is in the form of the ring rear of the differential transmission 52 and is coupled to shaft 37 through differential gearing in a manner to be described hereinafter.

In accordance with this invention, a further feed actuating mechanism in the form of a positioning device is provided. The positioning device is generally referred to by the numeral 53 and includes a shaft 54 which is coupled by the differential transmission 52 to the shaft 37 for driving the shaft 37 and feed screw 20 independently of the driving thereof by shaft 41.

The shaft 54 is provided with a worm wheel 55 which has in meshed engagement therewith a worm 56 carried by a drive shaft 57. In the simplest form of the invention, the drive shaft 57 is driven by a rotary hydraulic motor 58 of the reversible type. The operation of the hydraulic motor 58 is controlled by a reversing solenoid valve 60 and hydraulic lines 61 and 62 extend between the fluid motor 58 and the valve 60. Fluid under pressure is delivered to the valve 60 through a hydraulic line 63 from a pump 64 which, in turn, is connected to a reservoir 65 by a fluid line 66. A return line 67 extends between the reservoir 65 and the valve 60.

The opposite end of the drive shaft 57 from the end to which the fluid motor is coupled, is provided with a suitable brake 68 which is preferably an electrical brake. It is to be understood that the brake 68 is electrically coupled relative to the solenoid valve 60 in a manner wherein when the valve 60 is in a position to render the fluid motor 58 inoperative, the brake 68 is actuated and when the solenoid valve 60 is shifted to a position to operate the motor 58, the brake 68 is automatically released. The operation of the brake 68, as in the case of conventional electrical brakes, is instantaneous and there is no over-running of the drive shaft 57 once the power thereto has been removed.

Figure 4:
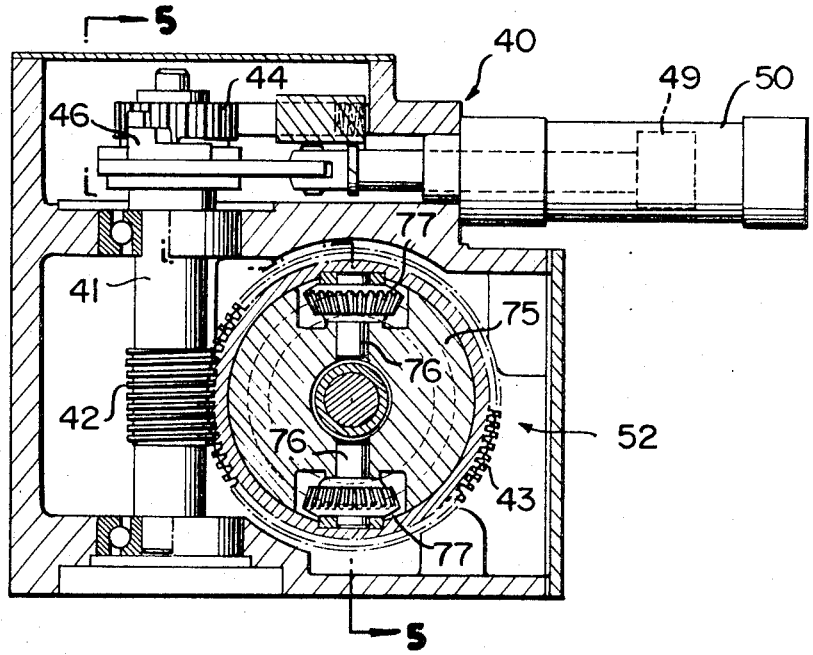
FIG. 4 is an enlarged fragmentary sectional view taken along the line 4—4 of FIG. 3 and shows specifically the details of the differential transmission.
Figure 5:
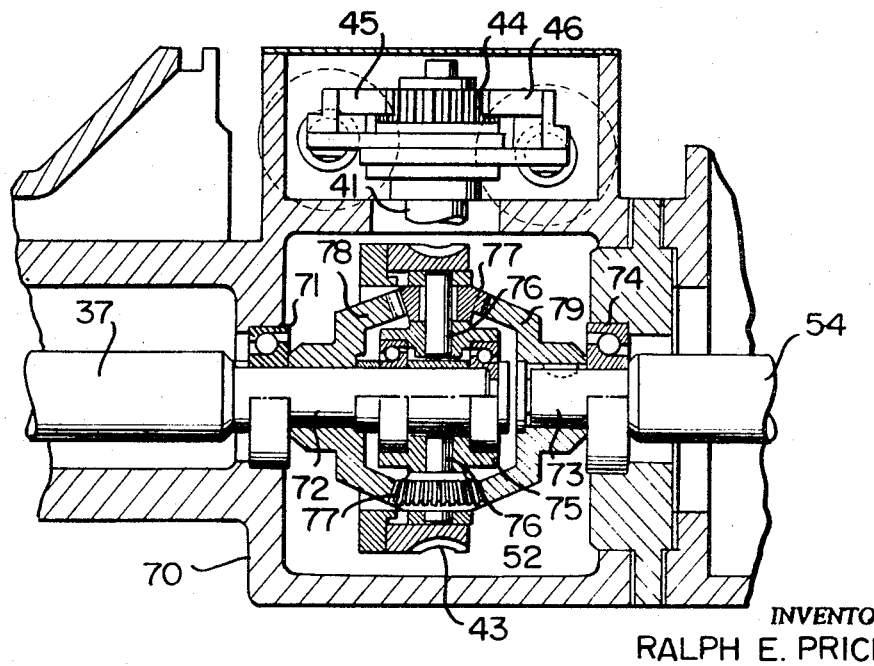
FIG. 5 is an enlarged fragmentary vertical sectional view taken along the line 5—5 of FIG. 4 and shows further the details of the differential transmission.

Reference is now made to FIGURES 4 and 5 wherein there are shown the details of the differential transmission 52. It is to be noted that a suitable support 70 is provided which support also supports the feed actuating mechanism 40. The support 70 carries a bearing 71 in which an extension 72 of the shaft 37 is rotatably journalled, the extension 72 being of a reduced diameter. In a like manner, a reduced diameter extension 73 of the shaft 54 is rotatably journalled in a bearing 74 carried by the support 70. It is to be noted that the extension 73 is appreciably shorter than the extension 72.

A carrier 75 is rotatably journalled on the shaft extension 72 in alignment with the worm wheel 43. As is clearly shown in FIGURE 4, the worm wheel 43 is directly carried by the carrier 75. The carrier 75 has mounted thereon a pair of diametrically opposed, radially extending stub shafts 76 on which there are rotatably journalled differential beveled pinions 77. It is to be noted that the pinions 77 are free to rotate relative to the carrier 75 and the carrier 75, the worm wheel 43, the shaft 76 and the pinion 77 are free to rotate as a unit about the shaft extension 72.

A bevel gear 78 is suitably secured to the shaft extension 72 for rotation therewith and is meshed with the pinions 77. A like bevel gear 79 is secured to the shaft extension 73 and is also meshed with the pinions 77. It will be apparent that in accordance with the usual function of differential transmissions, when the worm wheel 43 and the carrier 75 are held in a fixed position by the worm gear 42, and the shaft 54 is rotated, the pinions 77 will be driven to drive the bevel gear 78 and thus drive the shaft 37. Thus, shaft 37 can be driven by the shaft 54 to position the feed screw 20 independently of any function of the feed mechanism 40 and without changing the setting thereof. On the other hand, it will be seen that when the shaft 54 is fixed against rotation by the brake 68, the worm wheel 43 can be driven by the shaft 41 and due to the fact that the bevel gear 79 is fixed, the rotation of the pinions 77 about the axis of the shaft extension 72 will result in the driving of the bevel gear 78 with the resultant rotation of the shaft 37. Thus, the feed screw 20 can be driven by the feed mechanism 40 independently of the positioning device 53.

Referring once again to FIGURE 3 in particular, it will be seen that the shaft 54 is provided on the end thereof remote from the differential transmission 52 with a pinion 80 which is meshed with a gear 81. The gear 81 is carried by a shaft 82 which is the input shaft of a conventional rotary transducer 83. The transducer 83 is electrically connected in a conventional manner by means of wiring 84 to a combination device which includes a visual indicator 86 and dimension setting switches 85. The switches 85 are suitably electrically connected by wiring 87 to a suitable control panel 88 which, in turn, is suitably electrically connected by wiring 89 to the solenoid operated valve 60. The valve 60 may also be suitably operated by push button switches PBA and PBR.

Operation

In the conventional operation of the feed mechanism for the grinding wheel support, the rapid feeding thereof is effected by moving the feed screw 20 axially by the piston 21. The threads of the feed screw 20 engage the teeth of the worm wheel 24 on the vertical shaft 25, which is carried by the wheel support 15, so that the shaft 25 and the wheel support 15 move with the endwise movement of the feed screw 20.

At the end of the rapid feed movement, the grinding feed is initiated by movement of piston 30 to the left, causing rotation of the hand wheel 29, the hand wheel shaft 28 and the worm 27. The rotation of worm 27, through worm wheel 26, effects the rotation of the vertical shaft 25 in the wheel support 15. As the worm wheel 24 rotates, it functions as a pinion in engagement with the threads 23 of the feed screw 20 and advances the wheel support 15 relative to the feed screw 20 for a grinding operation.

At the end of the movement of piston 30, if the work has not yet been ground to the desired dimension, the increment feed is initiated by the reciprocation of piston 47 which actuates pawl 45 to rotate the ratchet 44. The rotation of ratchet 44 results in the rotation of the shaft 41 and worm 42 which, in turn, drives shaft 37 through the worm wheel 43.

The rotation of shaft 37 results in the rotation of the feed screw 20 through worm 38 and worm wheel 39. As the feed screw rotates, the worm wheel 24 functions as a nut and serves to advance the vertical shaft 25 and wheel support 15 relative to feed screw 20 an amount which may vary from one workpiece to another, until a suitable size control device, such as a caliper 18, signals that the workpiece is ground to the desired dimension and the end of the grinding operation has been reached. This rotation of feed screw 20 supplements rotation by the hydraulic motor 58 and compensates for wheel wear, machine variables, etc. The signal from the caliper 18 will cause retraction of the rapid feed piston 21 and the rough feed piston 30 to reset these elements of the feed mechanism. This same signal will also cause a fixed number of reciprocations of the piston 49 and the pawl 46 connected thereto to rotate the ratchet 44 and worm 42 in a direction to cause reverse rotation of the feed screw 20 to retract or reset the wheel support 15 and grinding wheel 16 a fixed amount from the point to which they had advanced.

The operation of the feed mechanism, as thus described, is substantially the same as that disclosed in the aforementioned Patent Nos. 3,046,706 and 3,047,988, except to the extent that it provides a precision modification of the position means.

The rapid positioning of the feed mechanism and the wheel support 15 for grinding widely varying diameters is accomplished by rapid rotation of the feed screw 20. The hydraulic motor 58 drives the shaft 57 and through the worm 56 and worm wheel 55 rotates the shaft 54. The shaft 54 is connected to shaft 37 through the differential transmission 52 even though the shaft 41, the worm 42 and the worm wheel 43 remain stationary during the positioning movement. The positioning movement is stopped when the position of the wheel support 15 and the position of the transducer 83 correspond to the dimension setting of switches 85. This movement of motor 58 is also transmitted through pinion 80 on shaft 54, the gear 81 on shaft 82 and transducer 83 to the visual indicator 86. The indicator 86 shows the dimension to which workpiece W is to be ground. It does not represent the position of the grinding wheel 16 at the end of the positioning movement. After the positioning movement, the grinding wheel 16 is further advanced by the feed mechanism 40 for grinding the workpiece. The dimension shown on the indicator 86 is the dimension when the caliper 18 signals the end of the grinding operation.

At this time, it is pointed out that the grinding machine is set up generally in the manner disclosed in U.S. Patent No. 3,192,675, granted July 6, 1965 by setting the feed for a known dimension and adjusting the visual indicator to show that dimension.

If it is desired to change the feed setting from a large dimension to a small dimension, the forward push button PBA is pushed by the operator to actuate the valve 60 to rotate the motor 58 in a direction to advance the wheel support 15. When the selected dimension appears on the visual indicator 86, the push button PBA is released and the positioning movement is stopped.

If it is desired to change from a small dimension to a large dimension, the push button PBR is pushed to actuate the solenoid controlled valve 60 and to shift the valve to a position to rotate the motor 58 in the retract direction. The wheel support 15 is then retracted to a point beyond the desired position and is then released, after which the push button PBA is closed to shift the valve 60 in the opposite direction to rotate the motor 58 to advance the wheel support 15 to the selected position. When the desired work dimension appears on the visual indicator 86, the push button PBA is released and the positioning movement is stopped. It is to be noted that by approaching the selected dimension from the same direction at all times, backlash is always taken up in the same direction.

If it is desired to change the position without depending on the visual indicator 86, the desired size may be preset by means of the dial switches 85. The positioning movement may then be initiated by a push button or suitable automatic means operable in conjunction with the placing of another portion of the workpiece in position for grinding such as by a carriage transducer 19 connected to a suitable readout and work carriage control (not shown). So long as there is a difference in the position of the wheel support 15 and the selected dimension on the dial circuit, as set by the dial switches 85, the motor 58 will be actuated and the wheel support 15 shifted until it stops in the position corresponding to the dimension selected by the dial switches 85. At this point, the solenoid which has actuated the valve 60 will be de-energized and the motor 58 will stop with the wheel support 15 in a position for grinding the selected dimension. Thereafter, the grinding cycle will proceed in the conventional manner.

Complete automatic selection of the operation of the positioner for successive changes in workpiece dimension may be effected by means of a punch card and card reader connected to the transducer 83 and caliper 18 to actuate solenoid valve 60 to perform the same function as the dial switches 85. A suitable selector device 110 may be used to change the control from the dial switches to the card reader.

Caliper 18 includes a probe which is connected to the core of a transducer. The probe is held in engagement with a workpiece by means of a spring. These details are shown in FIG. 1 of U.S. Patent No. 3,157,971, granted Nov. 24, 1964. When the caliper is shifted from a large workpiece portion to a small workpiece portion, the probe shifts accordingly to engage the small portion, and with the change in diameter of the portion due to grinding, the probe moves in a different zone. A certain point in this zone corresponds to the dimension represented by the new dial or punch card setting. When the workpiece has been ground to the diameter called for, the core of the transducer will have moved into the longitudinal position corresponding to the new diameter and will produce a signal through either the dial switches or the card reader through control panel 88 to shift the feed control solenoid valve to stop the grinding operation.

It is to be understood that although the invention has been specifically described in conjunction with a grinding machine and the feed mechanism has been specifically limited to the positioning of a support for a grinding wheel, the invention is not so limited. It is to be understood that the invention may be utilized in other types of machine tools. Also, it is to be understood that in certain machines, it may be more feasible to hold the machining element in a relatively fixed position and to advance or retract the workpiece. Such modifications may be readily made without departing from the spirit and scope of the invention, as defined by the appended claims.

I claim:
1. In a machine tool,
 (a) a bed,
 (b) a work support,
 (c) a machining element support and a machining element carried thereby,
 (d) means mounting said supports on said bed for relative movement,
 (e) feed means connected to at least one of said supports for varying the relationship of said supports;
 (f) said feed means including
 (g) a feed screw rotatably mounted on said bed,
 (h) feed actuating means for rotating said feed screw to effect a machining operation,
 (i) positioning means for rotating said feed screw before a machining operation to position said supports for machning a workpiece to a predetermined dimention,
 (j) and transmission means connecting said feed screw with said positioning means and said feed actuating means in a manner wherein said feed screw is rotatable independently by said positioning means and said feed actuating means.
2. The machine tool of claim 1 wherein
 (a) the transmission means is a differential.
3. The machine tool of claim 1 wherein
 (a) the differential has independent dual inputs and a single output.
4. The machine tool of claim 1 together with
 (a) dimension registering means operable only by said positioning means and comprising
 (b) a visual indicator for showing the workpiece dimension for which the machine tool is set to machine, at any instant during the operation of said positioning means.
5. The machine tool of claim 1 wherein
 (a) said work support is fixed and said machining element support is movable,
 (b) and said feed means are connected to said machining element support.
6. The machine tool of claim 1 wherein
 (a) said feed means includes other feed devices interposed between said feed screw and said one support.
7. The machine tool of claim 1 wherein
 (a) said positioning means has a reversible drive.
8. The machine tool of claim 1 wherein
 (a) said machining element is a grinding wheel and said machine tool is a grinding machine.
9. The machine tool of claim 1 wherein said transmission means is a differential and includes
 (a) a ring gear mounted for rotation and coupled in a driven relation with said feed actuating means,
 (b) intermediate gears rotatably journalled on radial shafts carried by said ring gear for rotation therewith,
 (c) and oppositely facing gears respectively secured to said feed screw and said positioning means on opposite sides of said intermediate gears and in meshing engagement therewith.
10. The machine tool of claim 1 wherein
 (a) said feed actuating means and said positioning means each have means for preventing the driving of one by the other through said transmission means.
11. The machine tool of claim 1 wherein
 (a) said transmission means provides a connection between said feed actuating means, said positioning means and said feed screw of the type wherein said feed actuating means modifies the effect of said positioning means in accordance with random changes in the relation between said work support and said machining element support, and including wear of said machining element.
12. In a machine tool,
 (a) a bed,
 (b) a work support,
 (c) a machining element support and a machining element carried thereby,
 (d) means mounting said supports on said bed for relative movement,
 (e) feed means connected to at least one of said supports for varying the relationship of said supports;
 (f) said feed means including

(g) a feed screw rotatably mounted on said bed,
(h) feed actuating means for rotating said feed screw to effect a machining operation,
(i) positioning means for rotating said feed screw before a machining operation to position said supports for machining a workpiece to a predetermined dimension,
(j) control means for said positioning means,
(k) means for setting said control means for a selected workpiece dimension,
(l) and connections between said control means and said positioning means to stop said positioning means when the position of said machining element corresponds to the setting of said control means.

13. In the machine tool of claim 12
(a) size control means operatively connected to said feed actuating means for controlling the operation thereof, and
(b) means for varying the setting of said size control means in accordance with the setting of said positioning means.

14. The machine tool of claim 12 wherein
(a) said machine tool is a grinding machine and said machining element is a grinding wheel.

15. In a machine tool,
(a) a bed,
(b) a work support,
(c) a machining element support and a machining element carried thereby,
(d) means mountng said supports on said bed for relative movement,
(e) feed means connected to at least one of said supports for varying the relationship of said supports;
(f) said feed means including
(g) a feed screw rotatably mounted on said bed,
(h) positioning means including a continuously operable driving means, for rotating said feed screw before a machining operation to adjust said feed means in preparation for machining a workpiece to a predetermined dimension,
(i) feed actuating means operable through said feed screw for advancing at least one of said supports for a machining operation,
(j) and means operable thereafter for rotating said feed screw to modify the adjustment of said feed means effected by said positioning means, whereby to complete said machining operation.

References Cited

UNITED STATES PATENTS

| | | | |
|---|---|---|---|
| 3,046,706 | 7/1962 | Price | 51—165 |
| 3,047,988 | 8/1962 | Price | 51—165 |
| 3,157,971 | 11/1964 | Snyder | 51—165 |
| 3,192,675 | 7/1965 | Fries et al. | 51—165 |

FOREIGN PATENTS 363,544    12/1931    Great Britain.

LESTER M. SWINGLE, Primary Examiner

PO-1050
(5/69)

UNITED STATES PATENT OFFICE
CERTIFICATE OF CORRECTION

Patent No. 3,466,976            Dated September 16, 1969

Inventor(s) RALPH E. PRICE

It is certified that error appears in the above-identified patent and that said Letters Patent are hereby corrected as shown below:

Page 1, column 1, the assignee of record should be -- Landis Tool Company --

SIGNED AND
SEALED
MAR 3 - 1970

(SEAL)
Attest:

Edward M. Fletcher, Jr.
Attesting Officer

WILLIAM E. SCHUYLER, Jr
Commissioner of Patents